(12) United States Patent
Salihi

(10) Patent No.: US 11,533,599 B2
(45) Date of Patent: *Dec. 20, 2022

(54) WIRELESS SERVICE PROVIDER SYSTEM FOR SELLING AND/OR ACTIVATING WIRELESS SERVICES FOR A WIRELESS DEVICE

(71) Applicant: TracFone Wireless, Inc., Miami, FL (US)

(72) Inventor: Dana Salihi, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/922,156

(22) Filed: Jul. 7, 2020

(65) Prior Publication Data

US 2020/0336880 A1      Oct. 22, 2020

Related U.S. Application Data

(63) Continuation of application No. 14/976,760, filed on Dec. 21, 2015, now Pat. No. 10,708,742.

(Continued)

(51) Int. Cl.
*G06Q 20/22* (2012.01)
*H04W 4/80* (2018.01)
(Continued)

(52) U.S. Cl.
CPC .............. *H04W 4/80* (2018.02); *G06Q 20/28* (2013.01); *G06Q 20/3278* (2013.01); *G06Q 20/342* (2013.01); *G06Q 20/352* (2013.01);
*G06Q 20/385* (2013.01); *H04M 15/47* (2013.01); *H04M 15/48* (2013.01); *H04M 15/59* (2013.01); *H04M 15/61* (2013.01); *H04M 15/93* (2013.01); *H04M 17/02* (2013.01); *H04M 17/204* (2013.01); *H04W 4/24* (2013.01); *H04W 12/50* (2021.01); *H04M 2017/26* (2013.01); *H04W 12/06* (2013.01); *H04W 12/71* (2021.01)

(58) Field of Classification Search
None
See application file for complete search history.

(56) References Cited

U.S. PATENT DOCUMENTS

| | | | |
|---|---|---|---|
| 8,474,694 B2 | 7/2013 | Chakiris et al. | |
| 10,708,742 B2 * | 7/2020 | Salihi | H04M 17/204 |

(Continued)

*Primary Examiner* — Paul Danneman

(57) ABSTRACT

A method and system for the purchase and activation of services on a wireless device are provided. The method and system include the use of an airtime card with a near field communication tag with a unique identifier code used to improve a user's experience and ease of activation/provisioning of services for the wireless device. In some aspects, the unique identifier may be generated during the activation and purchase of the wireless service and it is not required that the unique identifier code be recorded in a backend system of the wireless provider prior to activation. The services to be purchased and activated may include at least one of the following: out of the box activation, device upgrades, device reactivations, wireless number changes, wireless number porting, and the addition or purchasing of services including airtime, data, and/or SMS enrollments or data content.

20 Claims, 8 Drawing Sheets

Related U.S. Application Data

(60) Provisional application No. 62/094,477, filed on Dec. 19, 2014.

(51) Int. Cl.
| | |
|---|---|
| *H04M 15/00* | (2006.01) |
| *G06Q 20/32* | (2012.01) |
| *H04W 4/24* | (2018.01) |
| *H04M 17/02* | (2006.01) |
| *H04M 17/00* | (2006.01) |
| *G06Q 20/28* | (2012.01) |
| *G06Q 20/34* | (2012.01) |
| *G06Q 20/38* | (2012.01) |
| *H04W 12/50* | (2021.01) |
| *H04W 12/06* | (2021.01) |
| *H04W 12/71* | (2021.01) |

(56) References Cited

U.S. PATENT DOCUMENTS

| | | |
|---|---|---|
| 2009/0096574 A1 | 4/2009 | Oberle |
| 2009/0214012 A1 | 8/2009 | Ingalsbe et al. |
| 2010/0201310 A1 | 8/2010 | Vorenkamp et al. |
| 2010/0294835 A1 | 11/2010 | Bam et al. |
| 2016/0182713 A1 | 6/2016 | Salihi |

\* cited by examiner

300

350

WIRELESS SERVICE PROVIDER SYSTEM FOR SELLING AND/OR ACTIVATING WIRELESS SERVICES FOR A WIRELESS DEVICE

CROSS REFERENCE TO PRIOR APPLICATIONS

This application is a continuation of U.S. application Ser. No. 14/976,760 filed on Dec. 21, 2015, now U.S. Pat. No. 10,708,742, issued Jul. 7, 2020, which is hereby incorporated by reference for all purposes as if fully set forth herein, which application claims the benefit from U.S. Provisional Application No. 62/094,477 filed on Dec. 19, 2014, which is hereby incorporated by reference for all purposes as if fully set forth herein.

BACKGROUND OF THE DISCLOSURE

1. Field of the Disclosure

The invention relates to a system for activating wireless services on wireless devices. More particularly, the invention relates to methods for activating wireless services on wireless devices using a system including a near field communication tag.

2. Related Art

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used.

The services provided by both the MNOs and MVNOs often implement activation cards, also known as airtime cards, for the sale and activation and/or addition of a wireless service, e.g. talk airtime, data, or text messaging. Activation cards generally include a unique code that may include a scratch off area obscuring the unique code. Codes are correlated to a wireless service and must be recorded in a service provider's database prior to distributing the activation card to a respective point-of-sale and reaching the customer. A record of every airtime card distributed is therefore kept for the activation of the corresponding wireless service until the card becomes obsolete through redemption or expiration. Once a card is sold to a user, the user must manually scratch off the covering of the code and manually enter the code and for activation of the wireless service. Codes are generally made long and complex to prevent unauthorized use of the codes to activate non-purchased wireless services.

Convenience, timeliness, and reliability of the wireless providers' backend systems are key factors that play into a user's experience. By developing a system to improve at least these factors, a more positive experience can be provided to the user. The improved experience will help retain customer base and increase the amount of customers willing to purchase wireless services from MNOs and MVNOs. In order to do so, the following needs can be addressed by enabling new improved systems that can be implemented for the activation of a wireless service.

A need exists to decrease the amount of processing of the backend systems of wireless providers to provide faster activation of wireless services. In particular, a solution for a simplified and safe way to maintain and manage inventory of airtime cards used for the activation of wireless services is desired.

Another need in the art also exists for an error free and more expedient method and system for customers to extend cellular services using airtime cards.

A further need exists in the art for a method, system and application to enable wireless providers and retailers to sell and authenticate wireless services in convenient locations, including transient locations, in an expedited manner, and without compromising unauthorized activation of services or the security of the wireless providers' backend systems.

Accordingly, a more convenient, secure, and time efficient approach is needed for the sale and activation of wireless services.

SUMMARY OF THE DISCLOSURE

The foregoing needs are met, to a great extent, by the invention, providing a system and associated methods for activating services and subscriptions on wireless devices and/or systems implementing a near field reader. In particular, the invention is intended to solve the challenges by using a near field communication tag with at least one unique identifier that corresponds to a purchased/selected wireless service and/or subscription. According to some aspects of the disclosure, the services requested to be activated may include at least one of initial provisioning or activation, device upgrades, device reactivations, wireless number changes, the addition or purchase of services including airtime, data and text messaging, enrollments or content, and wireless number porting for wireless devices that have already been activated.

According to aspects of the disclosure, a system for selling a wireless service is disclosed. The system can include a near field communication reader in communication a computer. The computer including a processor and a storage device can be in logical communication with the processor. The storage device may also include executable software stored and executable on demand to be operative with the processor to cause the computer to: receive, through the near field communication reader, a unique identifier of a near field communication tag; receive a payment confirmation for the wireless service corresponding to the unique identifier of the near field communication tag; and transmit an activation message including the unique identifier of the near field communication tag to a wireless provider for authorization of a wireless service.

According to some additional aspects, a method of selling wireless services for a wireless device is disclosed. The method including: receiving, through the near field communication reader, a unique identifier of a near field communication tag corresponding to a wireless service; receiving payment confirmation for a wireless service corresponding to the unique identifier of the near field communication tag; and transmitting an activation message including the unique identifier of the near field communication tag to a wireless provider for activation of the wireless services.

In yet additional aspects of the disclosure, a method of selling wireless services for a wireless device is disclosed. The method including: receiving, through the near field communication reader, a unique identifier of a near field communication tag corresponding to a wireless service; locking the unique identifier corresponding to the wireless service being purchased; and transmitting an authorization message including the unique identifier of the near field communication tag to a processor of a wireless provider to generate an activation authorization of the wireless services corresponding to the unique identifier of the near field communication tag.

There has thus been outlined, rather broadly, certain aspects of the invention in order that the detailed description thereof herein may be better understood, and in order that the present contribution to the art may be better appreciated. There are, of course, additional aspects of the invention that will be described below and which will also form the subject matter of the claims appended hereto.

In this respect, before explaining at least one aspects of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
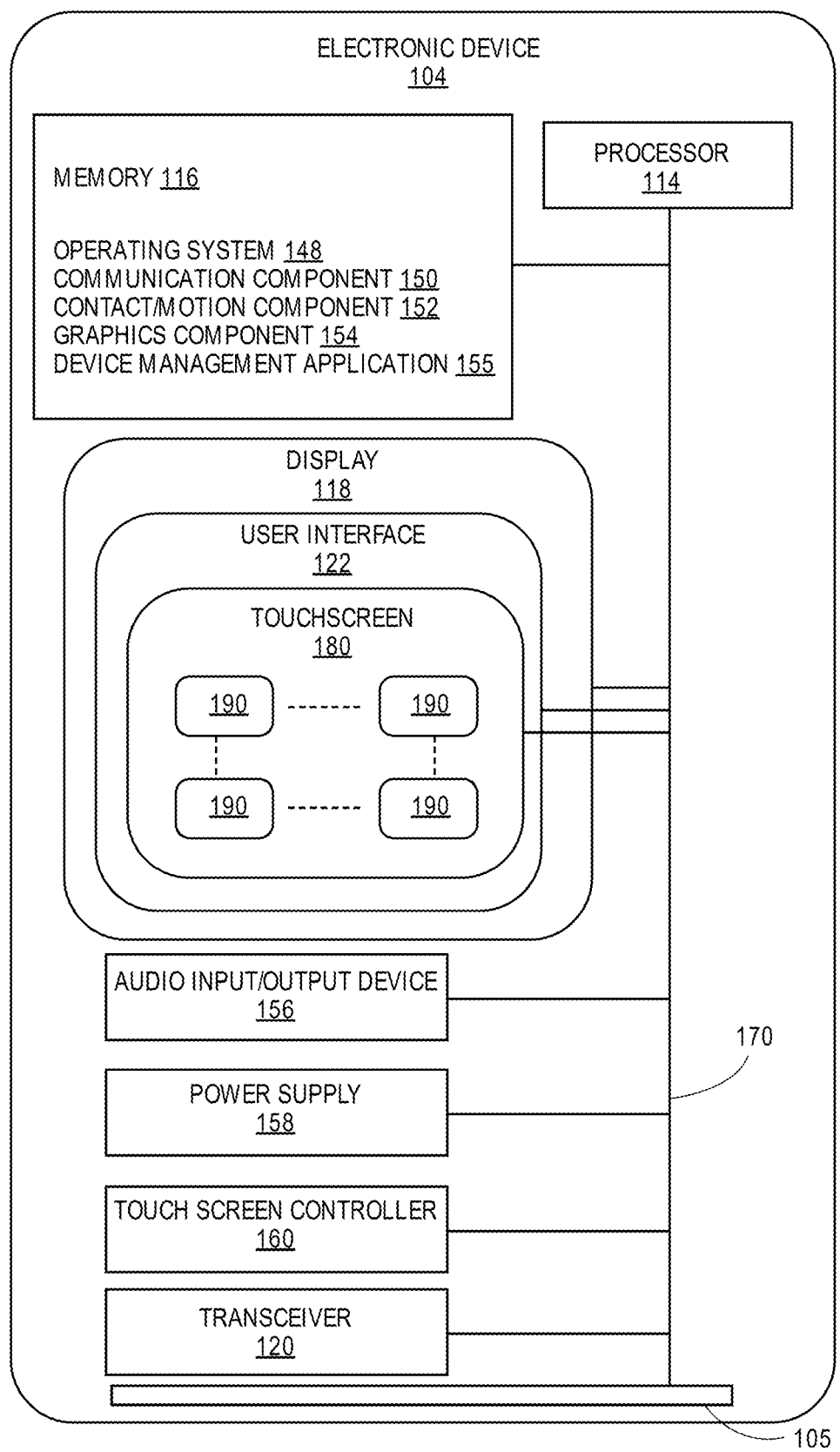
FIG. 1 illustrates a block diagram with exemplary components of a wireless device in accordance with aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone." With respect to remote alert devices, data transmission over a wireless network, including on a pre-paid basis using a near field communication card, is contemplated for alarm fobs, wireless remote camera devices, vehicle monitoring systems, home based security systems that do not require a landline or use both a landline and a wireless network for added reliability, and similar systems where wireless network authorization may be provided with a near field communication card. The vehicle monitoring system may include a vehicle communication interface, components to determine vehicle operation, and/or the like. The home based security system may include door sensors, window sensors, motion detectors, interface devices, and/or the like.

A "point-of-sale" as used herein can refer to a location where one or more wireless devices and/or services can be sold and/or activated which may or may not require sales personnel. A point-of-sale can include, for example, a vending machine, an automated kiosk, a retailer store, a gas station, and such.

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network that may utilize the teachings of the present application to sell, activate, monitor, redeem, and/or track, the activation of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Referring now to FIG. 1, a block diagram with exemplary components of a wireless device 104 in accordance with aspects of the disclosure is shown. In particular, the exemplary components which include a near field communication interface 105, e.g., reader or scanner, which may be used in conjunction with one or more near field communication tag(s) (shown in FIG. 3B) during the distribution, verification, and/or sale/purchase, of a wireless service. The near field communication tag may include a radio frequency identification chip that includes ISO/IEC 14443 protocols. Other uses of the near field communication interface 105 for the activation of a wireless service can include but are not limited to a change of phone settings, an activation message (e.g. text message) to be created and sent, starting of an app. (e.g. payment app.), and the such.

The near field communication interface 105 can be in communication with a processor 114, memory 116, and a user interface 122. The processor 114 may be a central processing unit configured to execute instructions such as instructions related to software programs. Any processor can be used for the electronic device as understood to those of ordinary skill in the art. The display 118 may be a liquid crystal display (LCD). Preferably the LCD includes a backlight to illuminate the various color liquid crystals to provide a more colorful display. The user interface 122 may be any type of physical input as readily employed in the field. For example, the user interface 122 may have physical buttons. Alternatively, the user interface 122 may be implemented in a touchscreen 180, a motion sensor (not shown), and the such. Finally, wireless device 104 may include a power supply 158.

The memory 116 of the wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM, UICC, cloud-based memory, flash memory or the like. These various components may be connected through various communication lines including a data bus 170.

The wireless device 104 can include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to audio converter for audio input and output functions respectively.

In another aspect, the wireless device 104 may include a transceiver 120. The wireless device 104 may provide radio and signal processing as needed to access a wireless network for services. The processor 114 may be configured to process call functions, data transfer, and the like and provide an array of services, based on those functions, to the user.

In an exemplary aspect, the touchscreen 180 of the invention may be implemented in the display 118 and may detect a presence and location of a touch of a user within the display area. For example, touching the display 118 of the wireless device 104 with a finger or hand. The touchscreen 180 may also sense other passive objects, such as a stylus and/or, in some aspects, for example, the touchscreen 180 may serve as the near field communication interface 105 when the near field communication tag(s) include a conductive component. Additionally, the wireless device 104 may further include a touch screen controller 160.

In one operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touchscreen, self-capacitance sensors, infrared sensors, dispersive signal technology, acoustic pulse recognition, or the like. As previously mentioned, the touchscreen 180 can function as the near field communication interface 105 when conductive near field communication tags can be implemented according to aspects of the present disclosure.

The display 118 is generally configured to display a graphical user interface (GUI) 122 that provides an easy to use visual interface between a user of the wireless device 104 and the operating system or application(s) running on the wireless device 104. Generally, the GUI presents programs, files and operational options with graphical images. During operation, the user may select and activate various graphical images displayed on the display 118 in order to initiate functions and tasks associated therewith.

In another aspect of the invention, the memory 116 of a wireless device 104 can include a database for storing user information. The user information may include information such as full name, address, email address, contact number, credit card information, and the like. In one aspect, the database may include security questions. In another aspect, the database may include user specified preferences.

In yet another aspect of the application, the memory 116 of a wireless device 104 can include a wireless service activation application 155. The application 155 may be preinstalled or downloaded from an application store. The wireless service activation application 155 may be configured to control use of the wireless device 104 based on interaction with a wireless provider backend server (shown in FIG. 4) and/or one or more near field communication tag(s) (shown in FIG. 3B) for the activation of a wireless service. The wireless service activation application 155 may utilize an internal accounting module to establish an account with a representation of prepaid funds or available credit for wireless services. In some aspects, the internal accounting module of the wireless service activation application 155 may also be used to store and/or transmit a plurality of charge rates as well as a billing/payment algorithm. The internal accounting module can classify each wireless service (data, voice, SMS) into one of a plurality of billing categories; receive data correlated to the near field communication tag(s) identifier, select a charge rate corresponding to that billing category; calculate an appropriate charge for the data usage, voice usage, and SMS usage in real time by using the selected charge rate; and apply this appropriate charge to the account. For example, upon the retrieval and/or verification of a unique identifier of a near field communication tag by the near field communication interface 105, the one or more steps may automatically take place to apply an appropriate charge to the account.

In some aspects, once the internal accounting module determines that the amount of wireless service (data, voice, SMS) used has depleted the account zero, the processor 114 may interact with the internal accounting module and/or the wireless provider backend system to limit, prevent, alert the user, and/or control further use of the wireless device 104 as further described herein. The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service. In this aspect, the wireless service activation application 155 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a near field communication tag, the host processor may be capable of ascertaining the operating codes needed to activate that particular wireless device or needed to set its account amount.

Figures 2A, 2B:
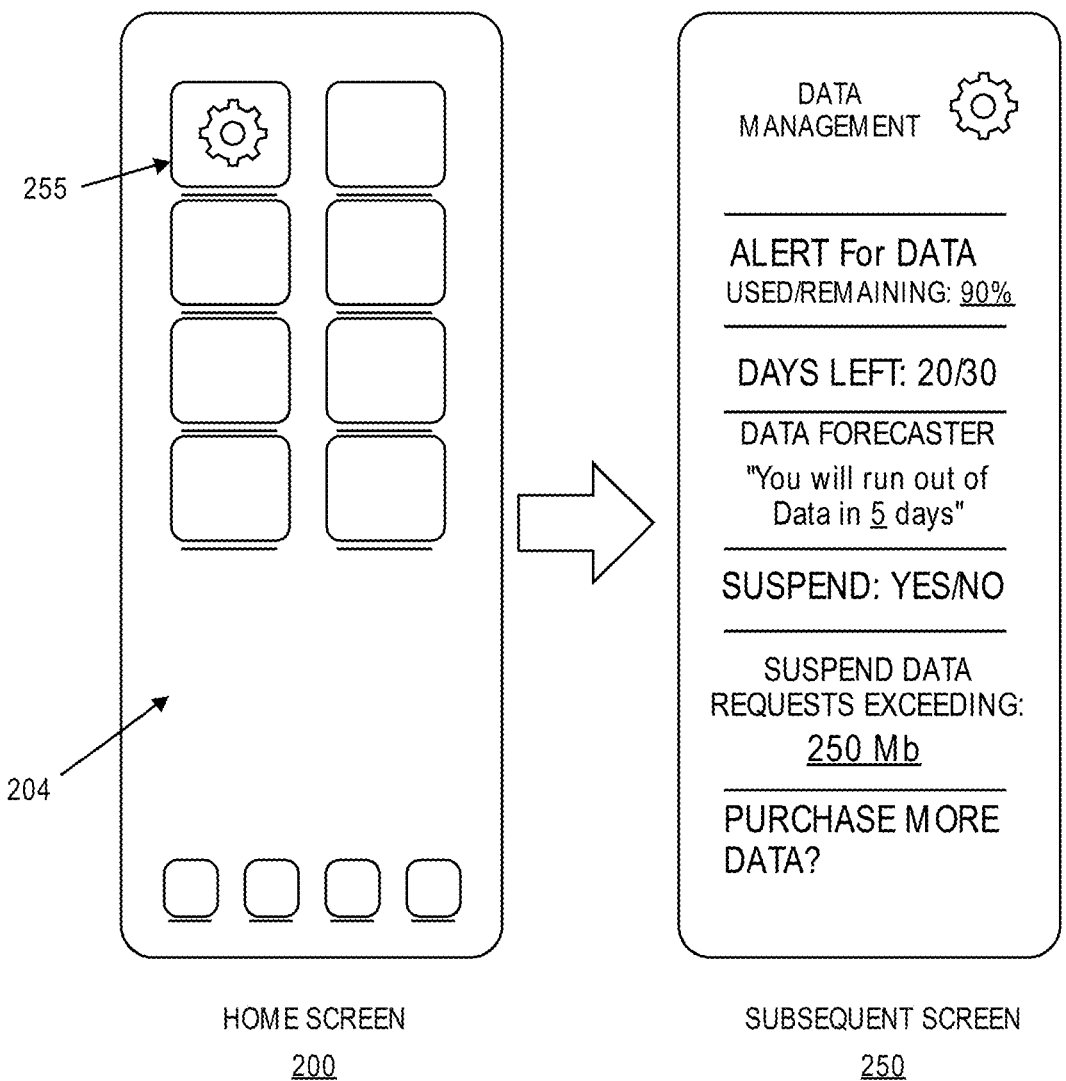
FIG. 2A illustrates an exemplary wireless device with a display of a home screen and FIG. 2B a subsequent screen of a wireless service activation application with a graphical user interface, both which may be used for the selection and control of the activation of a wireless service in accordance with an aspect of the disclosure.

FIG. 2A illustrates an exemplary wireless device with a display of a home screen and FIG. 2B a subsequent screen of a wireless service activation application with a graphical user interface, both which may be used for the selection and control of the activation of a wireless service in accordance with an aspect of the disclosure. The home screen 200 may include a plurality of icons, e.g. 204, and is not limited to a calling icon, texting icon, internet icon, and the like, allowing a user to perform one or more functions on the wireless device 104. For example, the home screen 200 may also display icons for one or more application that have been downloaded from the Internet or pre-installed, and unlocked/retrieved using one or more near field communication tag(s). In some aspects, a digital wallet/payment application such as Google Wallet™, Google Play™, Android Market™, Apple Store™, or the like, may also function with the one or more near field communication tag(s) to process a payment during the activation of one or more selected wireless service.

Some of the payment and/or authentication applications may be stored in a robust manner that prevents a user from deleting, modifying, tampering, and the like, with the application's functionality. In this regard, the activation service application 255, for example, can provide data management information, as depicted in subsequent screen 250, but may not allow or limit user's input for the activation and/or control of the wireless services. Further, in some aspects the provision of the options depicted in the subsequent screen 250 to the user may only be made available during activation of a wireless service and verification of a unique identifier of a near field communication tag.

Figure 3A:
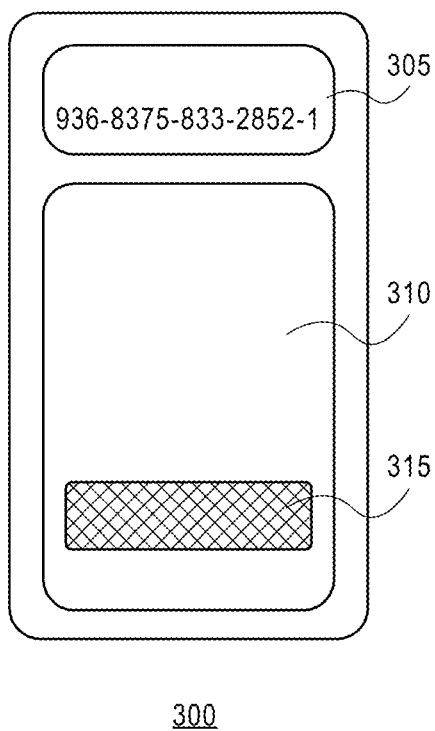
FIG. 3A illustrates a conventional airtime card used for the sale and activation of a wireless service.

Referring now to FIG. 3A, a conventional airtime card used for the sale and activation of a wireless service is depicted. In particular, the conventional airtime card 300 may include a unique code 315, located under a scratch-off panel, which must be manually entered into the phone after the retailer accepts payment. The unique code 315 under the scratch-off panel is often long, i.e. 16 digit code, is inconvenient, time consuming, and error prone. Shortening the code however can compromise the security of the system and allow for unauthorized activation of services. Further, because the code must be kept hidden until payment has been accepted, although it is not tamper proof and is inconvenient, the scratch-off panel is needed as a cost effective means to keep the unique code 315 hidden as it has previously been recorded and correlated to a credit amount for a particular wireless service/wireless services packet, in backend system's database.

Prerecording and correlating the unique code 315 in the wireless provider backend system's database has certain drawbacks. Mainly because after the conventional airtime card 300 is distributed to the point of sale/customer, the correlated service for each unique code 315 cannot be practically changed. This inadequacy limits how and where the conventional airtime card 300 can be sold to the consumer as the danger of scratch-off panel tampering to obtain the wireless services in a fraudulent manner/without payment exists. The sale of these conventional airtime cards 300 as a result must be sold by a clerk and kept under surveillance.

Further, the conventional airtime card 300 may include a second code or a bar code 305 correlating the service provided by the unique code 315 to a price for the wireless service offered and advertised 310. The offered and advertised service 310 includes the wireless service provider and the specific amount of data and/or time being sold by each conventional airtime card 300. This requires that the point-of-sale (shown in FIG. 4 as 420) keep a number of conventional airtime cards 300 with different plan options in stock for each of the service providers. Because some wireless services, amounts, and companies, may sell more than others, a large stock must be maintained at each point-of-sale 420.

Figure 3B:
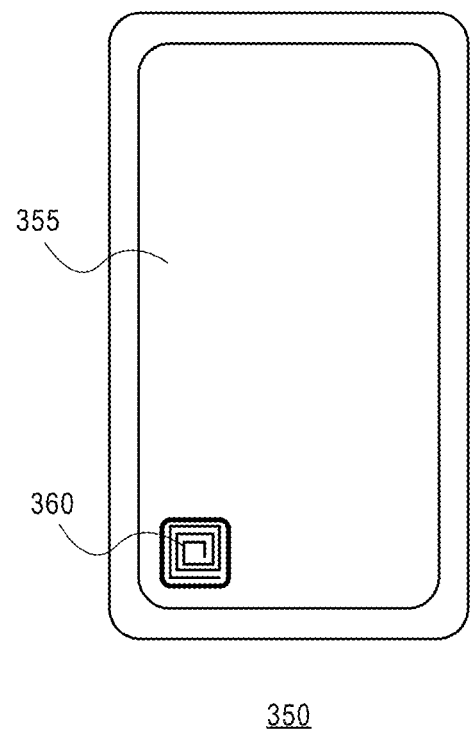
FIG. 3B illustrates an airtime card with a near field communication tag that can be used according to aspects of the disclosure.

Referring now to FIG. 3B, an airtime card 350 with a near field communication tag 360 according to aspects of the present disclosure is illustrated. In particular, the airtime card 350 can include a near field communication tag 360 including data that can correspond to a wireless service. In some aspects, more than one near field communication tag 360 can be included in the airtime card 350. The near field communication tag 360 may have either read only data capability or may have rewriteable data capability. As such, configurability, memory, security, data retention and write endurance, may all vary according to the activation application. The various variations of the near field communication tags included and number of tags which can be utilized to streamline the wireless service activation process, provide a more secure sale and activation process, provide for less data storage in backend databases, post distribution programmability of the airtime cards, and eliminate point-of-sale requirements.

One skilled in the art will appreciate from this disclosure that the airtime card 350 with the near field communication tag 360 can but does not need to be in the form of a card. Convenience, size, and ease of use may call for a smaller keychain type of airtime cards. In some aspects, for example, the data from the near field communication tag 360 may be may be transferred to a digital credit card type of device at the point-of-sale 420. More importantly, according to some aspects of the disclosure a near field communication equipped wireless device, e.g. smart phone or remote alarm device, can be paired with the near field communication tag 360 to automate a task including, for example, a change in phone settings, a text to be created and sent, an app. to be launched, or any number of commands to be executed, for the purchase/sale, payment, activation of a wireless service, and/or monitoring of wireless services sold/authorized. As previously mentioned, it is to be understood that the airtime card is not limited to the sale of "minutes" but can include any other type of data transmission over the wireless network which that be sold as a service.

The label of the airtime card 350 may also include a generic label 355 that corresponds to more than one type/amount of wireless service, and/or in some aspects, wireless carrier. This may be achieved when using a reprogrammable near field communication tag 360 which can be programmed during the selection and payment, for example. By providing for reprogramming capability of the near field communication tag 360 during the selection and payment, the selection of airtime cards 350 that must be kept in inventory at the point-of-sale 420 can be significantly reduced. Further, by simply bringing the near field communication enabled wireless device to a distance of 10 cm or less, the activation and purchase of wireless services can be automated and streamlined. For example, quicker verification of codes can result since the system is more secure and the need of storing all unique codes and correlated services on a backend system's database prior to distribution is eliminated. Further, the need for the scratch off panel and manual transmission of the complex unique code is also eliminated even in the simplest implementations.

Figure 4:
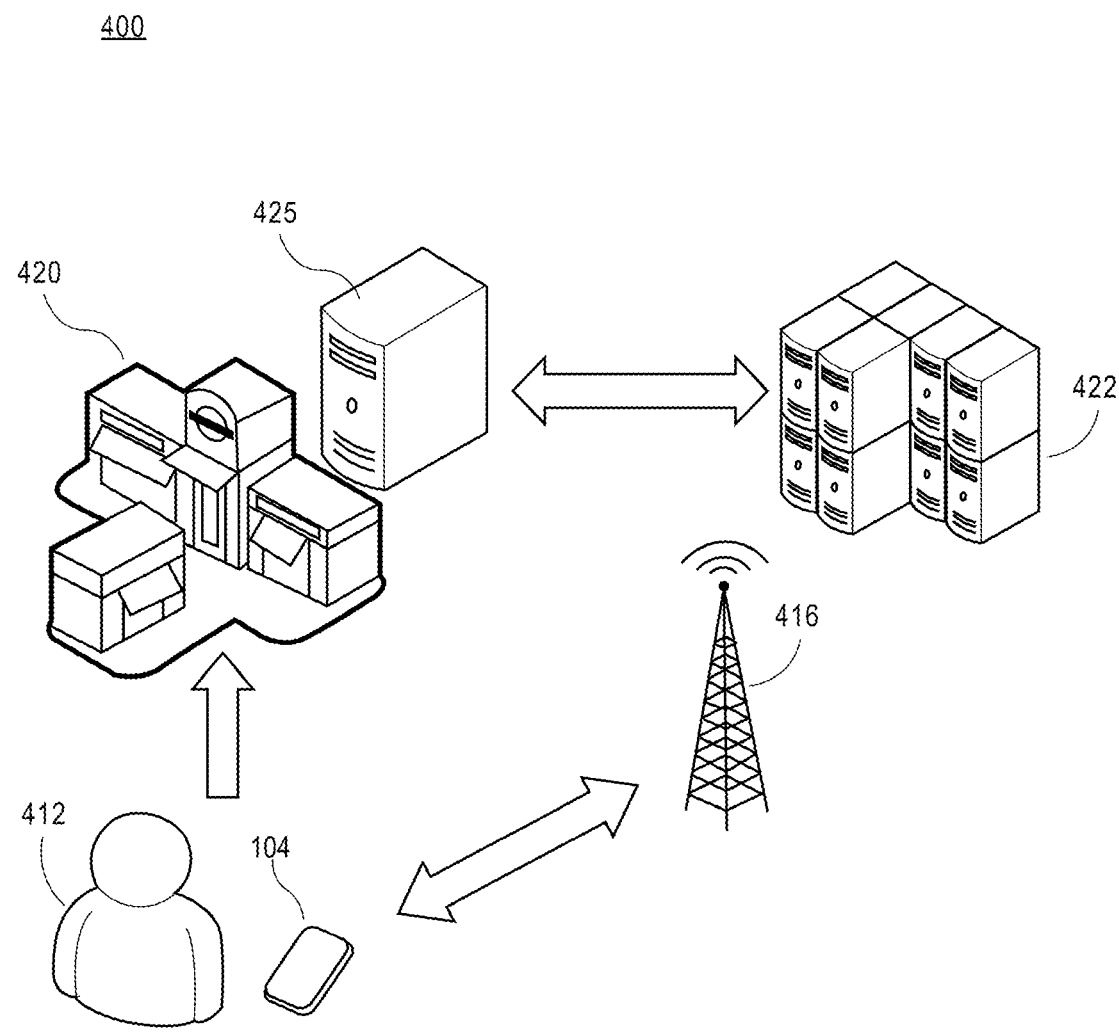
FIG. 4 illustrates a schematic diagram of an exemplary wireless service activation system in accordance with aspects of the disclosure.

Referring now to FIG. 4, a schematic diagram of an exemplary wireless service activation system according to aspects of the disclosure is depicted. In particular, the wireless service activation system 400 can be used to activate wireless network service(s) on a wireless device 104 implementing various aspects of the near field communication systems disclosed. Unlike conventional activation processes for wireless devices that can require a user 412 to contact a live customer service representative, utilize an interactive voice response system from a landline or another wireless device, or access an Internet website by the user 412 to use a website activation system and enter long activation codes to activate services on a wireless device, the present wireless service activation system 400 can be used to activate a wireless device 104 and/or activate services with automated code/information gathering and without requiring access to an agent, website, or general wireless or landline telephone system.

According to aspects of the disclosure, the activated service(s) may include, for example, activation of a wireless service after or during the initial activation of the wireless device 104 by a user 412. The initial activation of the wireless device 104 may be described herein as "out of the box" activation and may take place at the point-of-sale 420. In some additional aspects, the services requested to be activated are one or combinations of: airtime, text messaging, and data plans, but may also include at least one of device upgrades, device reactivations, wireless number changes, and wireless number porting for wireless devices that have previously been activated. The wireless device 104 to have services activated may include a mobile phone, a smartphone, a wireless computing device or laptop, a tablet, a wireless handheld device, a mobile computing device, or other type of wireless device having services that can be activated wirelessly.

According to some aspects of the disclosure, the point-of-sale 420 can include, for example, a store retailer, a vending machine, a kiosk, and the such, which may also include a near field communication system 425 that can be used for payment and/or executing security and activation protocols using one or more near field communication tag(s) 360. Further, the near field communication system 425 at the point-of-sale 420 can be configured to communicate with the near field communication tag 360 and in some aspects the wireless device 104, which may also be configured to be in communication with a wireless provider backend system 422. Communication with the wireless device 104 may include, for example, one or more of: communication using the wireless device near field communication interface 105, a wire connector, a data messaging channel, such as an Unstructured Supplementary Service Data (USSD) channel, a Short Message Service (SMS) messaging channel or a Wireless Application Protocol (WAP) messaging channel, a personal area network (PAN), such as a Bluetooth™ communication, an induction wireless communication, an infrared wireless communication, an ultra-wideband communication, a ZigBee™ communication, a wireless fidelity communication channel, and a local area network (LAN).

Communication between the near field communication system 425 of the point-of-sale 420 and the wireless device 104 may be used to transmit a payment for a wireless service and/or automatically retrieve and/or generate wireless device-related information based on a user's input selection. According to some aspects of the present disclosure, the wireless service selection can be made by scanning a near field communication tag 360 of an airtime card 350 using the near field communication interface 105 of the wireless device 104, and can include a wireless provider selection, and/or a wireless service type and amount to be activated. In some aspects, the near field communication tag 360 can further be scanned by the near field communication system 425 at the point-of-sale 420, for example, for verification, authorization, and/or security encryption.

The wireless service selection, near field communication tag 360 unique identifier, and wireless device 104 related information may be transferred to a wireless provider backend system 422. The wireless device-related information can include, for example, the International Mobile Station Equipment Identify ("IMEI"), an Electronic Serial Number (ESN), Mobile Equipment Identifier (MEID), and/or a serial number for a subscriber identity module (SIM) card installed in the wireless device 104. The SIM card may include a SIM card memory for storing at least a SIM card serial number, for example, an Integrated Circuit Card ID (ICCID). A wireless device not utilizing a SIM card is contemplated as well for use with the invention.

In some aspects, the information transferred may be in the form of an activation message that corresponds and/or includes the wireless provider and/or wireless service selection by the user 412 and automatically retrieved wireless device related information, the near field communication tag 360 unique identifier, and/or payment/authorization verification from the point-of-sale 420. The activation message including the automatically retrieved information can be generated by a processor including, for example, the processor of the wireless device 104 and/or a processor at the point-of-sale 420. In some aspects, the activation message may be transmitted over a provisioning channel provided over a provisioning wireless carrier network 416 that is available to inactive or unprovisioned wireless devices or via any type of conventional activation protocols known in the art. Alternatively, the activation message can be transmitted from the point-of-sale 420 via any wired or other wireless communication type to the wireless provider backend system 422. The wireless provider backend system 422 can include one or more databases wherein authorized unique identifiers of a near field communication tag 360 may be correlated/recorded when a wireless service is redeemed and/or purchased.

Although it is not required in some aspects, the provisioning wireless carrier network 416 may be used to receive the activation message via a the provisioning channel and forward the activation message in real time to a subscriber provisioning wireless carrier network 416 operated by a service provider for the activation of one or more services for the wireless device 104. Accordingly, the services requested to be activated can include at least one of: an initial "out of the box" activation of wireless services of an unprovisioned wireless device 104 or device upgrades, device reactivations, wireless number changes, the addition or purchasing of services including airtime, enrollments or content, and wireless number porting for wireless devices 414 that have previously been activated or provisioned. In some aspects, the provisioning wireless carrier network 416 can be connected to a wireless carrier server and forward the activation message to the subscriber provisioning wireless carrier network 416, either directly or through a destination server connected to the subscriber provisioning wireless carrier network 416, to initiate service activation and provisioning of the wireless device 104.

Figure 5:
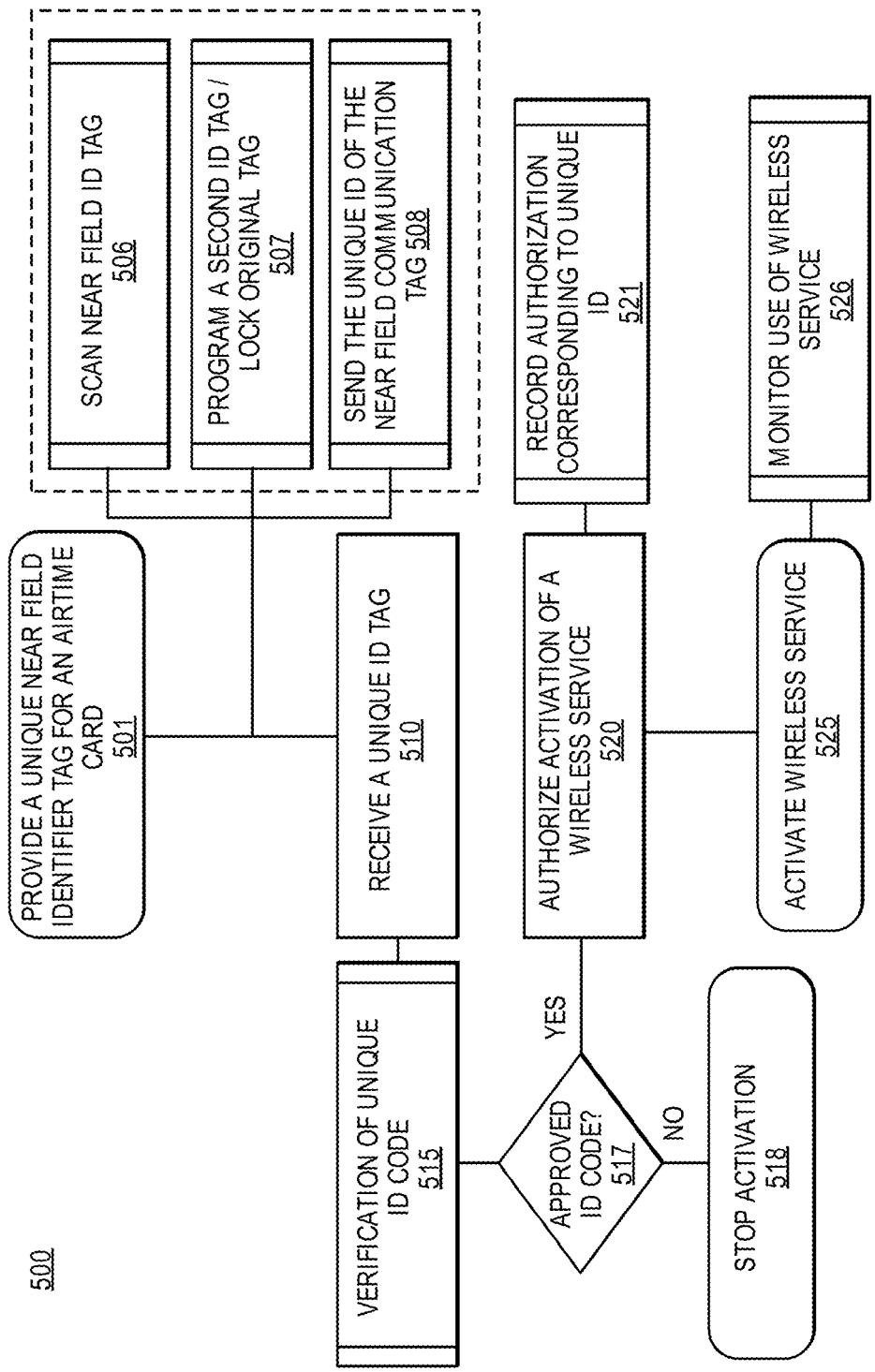
FIG. 5 illustrates exemplary method steps which may be used to implement the system of the disclosure.

Referring now to FIG. 5, exemplary method steps which may be used to implement systems of the disclosure are depicted in a flowchart 500. In particular, the method steps include ways in which the near field communication tag 360 of the airtime card 350 and the near field communication interface 105 of the wireless device 104 can be implemented to activate one or more wireless service(s) on the wireless device 104. At step 501, a near field communication tag 360 is provided for an airtime card 350 during manufacturing. The near field communication tag 360 may include a unique identifier that can correspond to a wireless provider selection and one or more wireless services to be activated. For example, the unique identifier may include a first code corresponding to a wireless provider, followed by a second code corresponding to a wireless service type, and followed by a third code corresponding to an amount. It is contemplated that additional codes may be included for additional services and amounts, security codes, as well as for production data for statistical analysis performed by the wireless provider, as it may be desired. Each of the codes may be a series of digits including letters, symbols, and/or numbers.

In some aspects, all of the codes, e.g. first code-third code, may be programmed to provide a unique identifier of the near field communication tag 360 during manufacturing and prior to distribution of the airtime cards 350 to the point-of-sale 420. However, in some aspects, only the first code may be programmed during manufacturing leaving the others to be programmed 505 at the point-of-sale 420. This may be implemented when it is desired to reduce the number of airtime cards 350 that are distributed in order to reduce inventory at each of the points-of-sale 420 or to increase security to deter unintended redemption.

At step 506, a near field communication tag 360 can be scanned using the near field communication interface 105 of the wireless device 104 and/or the near field communication system 425 at the point-of-sale 420. At step 507, a second near field communication tag 360 may be provided at the point-of-sale 420 depending on the wireless service, or combination of wireless services, selection made by the user 412. Alternatively or in addition to providing a second near field communication tag, at 507, the original near field communication tag 360 may be locked. Locking of the near field communication tag 360 may include encryption with wireless device 104 information and/or programming of an additional code into the near field communication tag to generate a unique identifier for the airtime card 350 and/or selection. At step 508, the locked identifier of step 506 may be transmitted to the wireless provider backend system 422.

At step 510 the unique near field communication tag 360 codes along with wireless device 104 information is received by the wireless provider backend system 422. At step 515, the wireless provider backend system 422 can verify the unique identification code by searching for the unique identification code in one or more databases to make sure the unique identification code has not been recorded/redeemed previously. At step 517, if the system finds the unique identification code is not approved, the activation of the wireless service will be stopped 518. Upon stopping the activation 518 of the wireless service, the wireless provider backend system 422 may send a warning message to the user 412 (e.g., using the wireless device 104) and/or the wireless provider. Alternatively at step 520, if when the unique identification code is approved (authentic, not been previously used, or the like), authorization of a wireless service, including payment verification, may take place. At step 521, the authorized unique identification code is recorded in a database of the wireless provider before, after, or during, the activation, of step 525, of the wireless service on the wireless device 104 takes place. At step 526, the use of the wireless service activated may be monitored to determine when the corresponding wireless service has been expended by the user 412.

Figure 6:
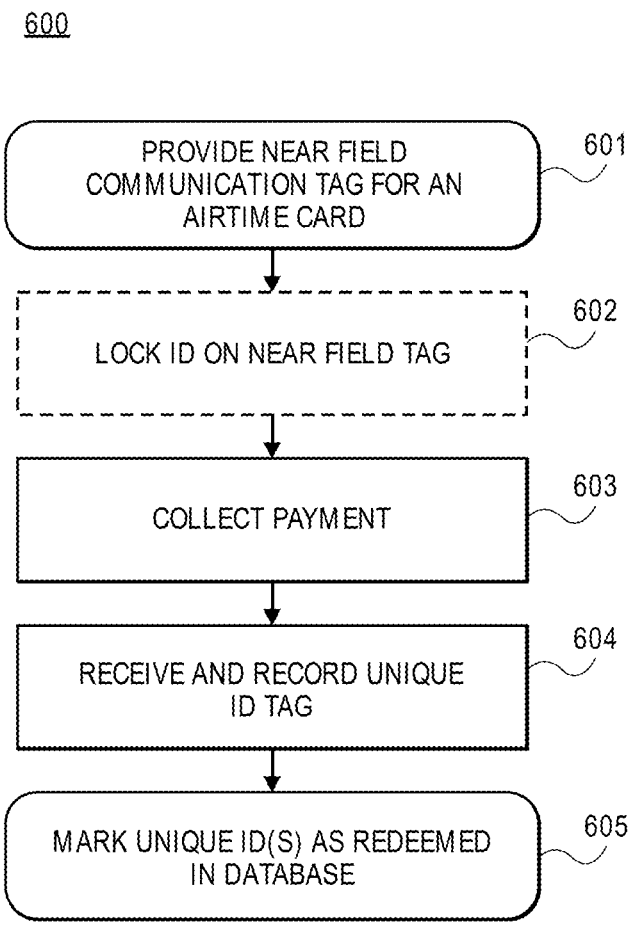
FIG. 6 illustrates an operation flow diagram with exemplary method steps that may be used for activating a wireless service on a wireless device at the point-of-sale according to aspects of the system of the disclosure.

Referring now to FIG. 6, an operation flow diagram 600 with exemplary method steps that may be used for selling and activating a wireless service on a wireless device at the point-of-sale according to aspects of the system of the disclosure is shown. In particular, the method steps which may be performed by one or more processors for the sale and activation of one or more wireless services at the point-of-sale 420. At step 601, a near field communication tag 360 for an airtime card 350 is provided. The near field communication tag 360 may be programmed with a unique identification code at the time of production before or after it is embedded onto the airtime card 350. No record of the unique identification code is required to be kept in the wireless provider backend system 422.

Optionally at step 602, the unique identifier may be locked on the tag to prevent it from being tampered with. Locking of the unique identifier may include, for example, encryption and/or the programming of a second code onto the near field communication tag 360 at the point-of-sale 420. At step 603, before or after the unique identifier is locked, payment is collected for the wireless service to be activated and corresponding to the unique identifier. After payment is confirmed, at step 604, the unique identifier of the near field communication tag 360 of the airtime card 350 can be submitted to the wireless provider backend system 422 to be recorded in a database. For example, the recording may be done in an active database that may be used for verification of active wireless services. During redemption, the unique identifier code(s) programmed may be processed along with information corresponding to the wireless device 104 in which the services are to be activated on by the wireless provider backend system 422 for service activation. Wireless device 104 information can include for example the international mobile station equipment identity (IMEI), the mobile equipment identifier (MEID), and/or the SIM card unique identifier. At step 605, after activation of the wireless service purchased, the unique identifier code(s) would be marked as redeemed in the database of the wireless provider backend system 422 to prevent duplicate redemption.

Figure 7:
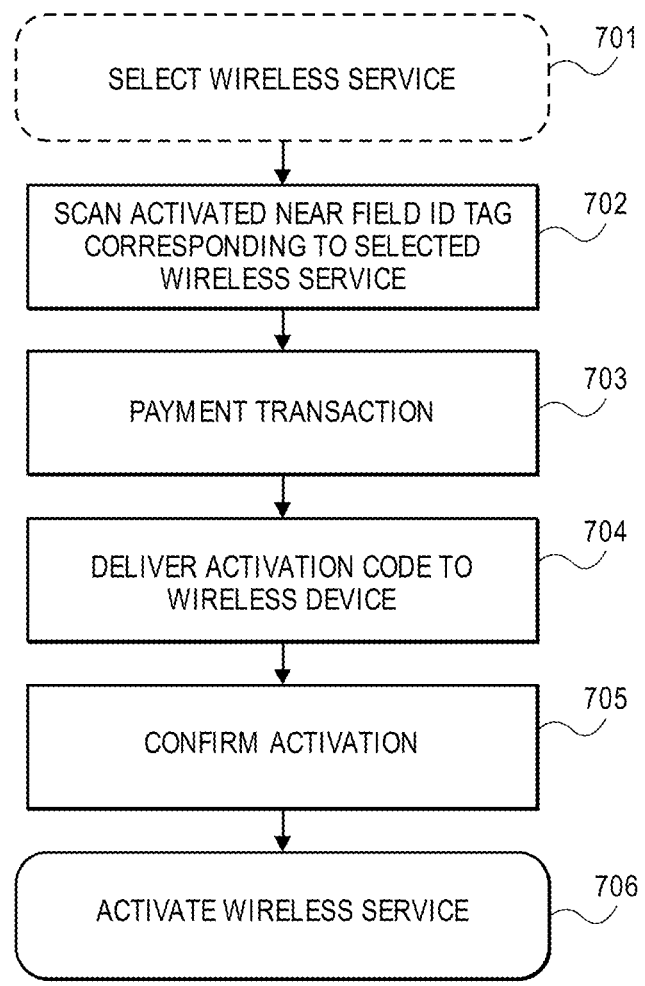
FIG. 7 illustrates an operation flow diagram with exemplary method steps that may be used for selling and activating a wireless service at the point-of-sale using a near field communication tag of an airtime card according to aspects of the disclosure.

Referring now to FIG. 7, an operation flow diagram 700 with exemplary method steps that may be used for selling and activating a wireless service at the point-of-sale 420 using a near field communication tag of an airtime card according to aspects of the present disclosure is shown. In particular, method steps that be performed by a computer to facilitate the sale of a wireless service at a point-of-sale are provided. At step 701, the user 412 or purchaser can select the wireless service, i.e. plan to be purchased, by terminal selection at the point-of-sale 420. At step 702, the near field communication tag 360 of an airtime card 350 may be scanned using a near field communication interface. The near field communication interface can include for example, a near field communication reader/scanner at the register that may be in communication with the computer system at the point-of sale, and/or the near field communication interface 105 of the wireless device 104. At step 703, payment transaction for the purchase of the wireless service may be completed via a digital wallet payment application installed on the wireless device. Digital wallet applications can include but are not limited to, for example, Google Wallet™, PayPal™, Amazon Payments™, and the such. According to some aspects, the digital wallet application can be used to transmit a payment to the payment processing register at the point-of-sale. Accordingly, the payment processing register can receive the unique identifier of a near field communication card and receive payment either through a salesperson or a digital wallet application.

At step 704, the activation code can be delivered to the wireless device 104 on which the wireless service is to be activated. For example, a near field communication transaction can be initiated by the point-of-sale 420 near field communication system 425 to launch a preinstalled near field communication activation application on the wireless device 104 and to deliver the activation code to the wireless device 104. The preinstalled near field communication activation application may automatically gather phone information including, for example, one or more of: the ESN, the IMEI, and the MEID of the wireless device 104, which can be used with the activation code during the activation of the wireless services. Optionally or in addition to, the preinstalled near field communication activation application and/or the activation code, could be delivered to an email account associated with the digital wallet, via the provisioning wireless carrier network 416, or a LAN network. At step 705, the user 412 may confirm the activation using the wireless device 104. At step 706, the user may elect to activate the wireless service at the time of purchase or save the activation code for future use.

Figure 8:
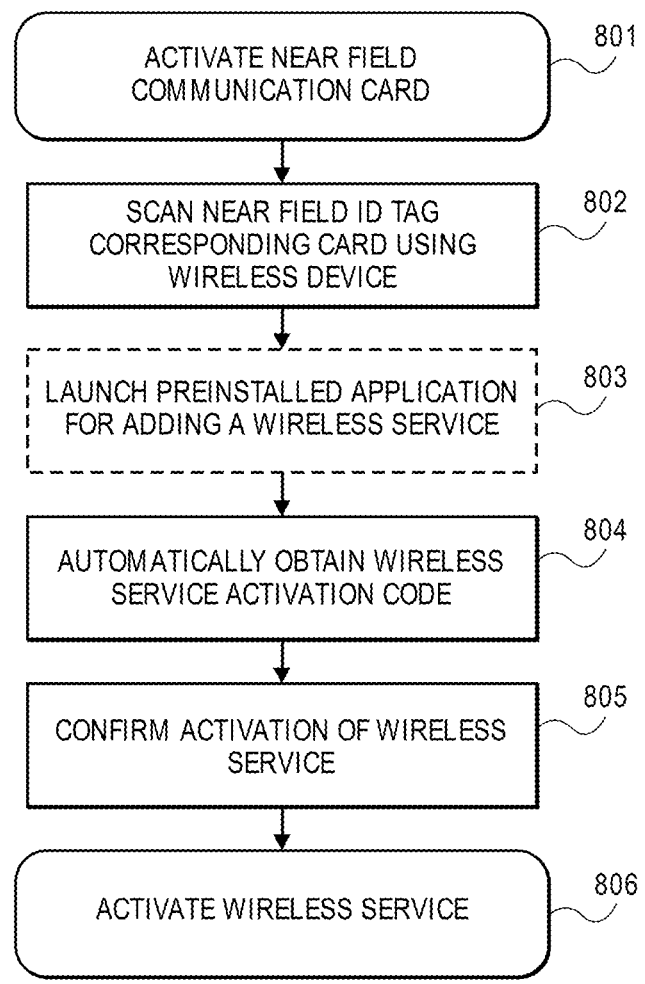
FIG. 8 illustrates an operation flow diagram with exemplary method steps that may be used for implementing an airtime card with a near field communication tag according to aspects of the disclosure.

Referring now to FIG. 8, an operation flow diagram 800 with exemplary method steps that may be used for implementing an airtime card with a near field communication tag according to aspects of the present disclosure is shown. In particular, method steps to provide a significantly faster and decrease errors associated with the use of airtime cards are disclosed. At step 801, the near field communication tag 360 can be activated at the point-of-sale 420. Activation can include receiving payment, verification of the unique identifier, and/or locking of the unique identifier codes. At step 802, the near field communication tag 360 including the activated unique identifier code may be scanned using the near field communication interface 105 of the wireless device 104. Optionally at step 804, the wireless device 104 may launch a preinstalled application that may be used to add the wireless service. At step 804, the near field communication tag 360 of the airtime card 350 is read by the application and the locked unique identifier can be obtained from the near field communication tag 360. The user 412 can then, at step 805, confirm the activation of the wireless services that correspond to the unique identifier using the preinstalled application for adding airtime services. At step 806, the application can add the airtime to the wireless device using for example, a provisioning wireless carrier network 416 and the wireless provider backend system 422 of the wireless provider.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A system for selling wireless service at a point-of-sale, the system comprising:
   a near field communication reader in communication with a computer implemented by the point-of-sale;
   the computer implemented by the point-of-sale comprising a processor and a storage device in logical communication with the processor and a terminal;
   the terminal configured to receive a wireless service selection that comprises at least one of the following: a type of wireless service and an amount of wireless service;
   executable software stored on the storage device and executable on demand, the executable software operative with the processor to cause the computer to:
      receive, through the near field communication reader implemented by the point-of-sale, a unique identifier of a near field communication tag;
      receive through the terminal implemented by the point-of-sale the wireless service selection;
      receive a payment confirmation at the point-of-sale after collection of payment for the wireless service corresponding to the selected wireless service to be associated with the unique identifier of the near field communication tag; and
      transmit from the point-of-sale an authorization message including the unique identifier of the near field communication tag and the selected wireless service to a wireless provider system for recording in a database and subsequent authorization of the wireless service;
   the wireless provider system is configured to receive a request for authorizing wireless service, the request for authorizing wireless service includes the unique identifier, the unique identifier being associated with the type of wireless service and the amount of wireless service, and the request for authorizing wireless service further includes at least one or more of the following: an electronic serial number, an international mobile station equipment identity, and a mobile equipment identifier; and the wireless provider system further including an accounting system configured to monitor and control the authorized wireless service utilized by a wireless device, wherein the wireless service includes one or more of the following: wireless data, text messaging, and wireless talk time.

2. The system of claim 1, wherein:
the unique identifier comprises at least one code corresponding to a wireless provider, a wireless service type, and an amount of wireless service;
the payment confirmation is generated by a payment processing register at the point-of-sale;
the wireless provider system and the accounting system are configured to control the authorized wireless service utilized by the wireless device; and
the control by the wireless provider system and the accounting system include at least one of the following: suspending voice calls, suspending text messages, and suspending wireless data service.

3. The system of claim 2, wherein:
a payment is transmitted to the payment processing register from a digital wallet application installed on a wireless device;
the database is configured to record the unique identifier of the near field communication tag after the payment confirmation;
the database is configured after activation of the wireless service purchased to mark the unique identifier as redeemed; and
the wireless device is configured to transmit to the wireless provider system on an Unstructured Supplementary Service Data (USSD) channel a request for authorizing wireless service that includes the unique identifier and further includes at least one or more of the following: the electronic serial number, the international mobile station equipment identity, and the mobile equipment identifier.

4. The system of claim 1, wherein:
the unique identifier comprises at least one code corresponding to a wireless provider, a wireless service type, and an amount of wireless service;
the near field communication tag is configured to be re-programmable; and
the executable software is additionally operative with the processor to cause the computer to program the near field communication tag associated with the unique identifier with data corresponding to the selected wireless service after the payment confirmation is received.

5. The system of claim 1, wherein:
the unique identifier comprises at least one code corresponding to a wireless provider, a wireless service type, and an amount of wireless service;
the wireless device is configured with a wireless service activation application executed by the wireless device; and
the wireless device executing the wireless service activation application to read the near field communication tag and to transmit to the wireless provider system on an Unstructured Supplementary Service Data (USSD) channel the request for authorizing wireless service that includes the unique identifier and further includes at least one or more of the following: the electronic serial number, the international mobile station equipment identity, and the mobile equipment identifier.

6. The system of claim 1, wherein:
the unique identifier comprises at least one code corresponding to a wireless provider, a wireless service type, and an amount of wireless service;
the wireless service includes the wireless data, the text messaging, and the wireless talk time;
the wireless provider system and the accounting system are configured to control the authorized wireless service utilized by the wireless device; and
the control by the wireless provider system and the accounting system include at least one of the following: suspending voice calls, suspending text messages, and suspending wireless data service.

7. The system of claim 1, wherein:
the unique identifier comprises at least one code corresponding to a wireless provider, a wireless service type, and an amount of wireless service;
the near field communication reader is configured to interact with a near field communication tag comprising a radio frequency identification chip that includes ISO/IEC 14443 protocols;
the wireless provider system and the accounting system are configured to control the authorized wireless service utilized by the wireless device; and
the control by the wireless provider system and the accounting system include at least one of the following: suspending voice calls, suspending text messages, and suspending wireless data service.

8. The system of claim 7, wherein:
the near field communication tag forms part of a wireless service airtime card;
the near field communication tag is configured to be locked utilizing encryption; and
the wireless device is configured to transmit to the wireless provider system on an Unstructured Supplementary Service Data (USSD) channel a request for authorizing wireless service that includes the unique identifier and further includes at least one or more of the following: the electronic serial number, the international mobile station equipment identity, and the mobile equipment identifier.

9. The system of claim 8, wherein:
the database is configured to record the unique identifier of the near field communication tag after the payment confirmation;
the database is configured after activation of the wireless service purchased to mark the unique identifier as redeemed; and
the database does not include any unique identifiers corresponding to non-activated wireless services of near field communication tags.

10. A method of selling wireless services for a wireless device, the method comprising:
receiving, through a near field communication reader associated with a point-of-sale system, a unique identifier of a near field communication tag corresponding to a wireless service;
receiving a wireless service selection through a terminal implemented by the point-of-sale system, the wireless service selection comprises at least one of the following: a type of wireless service and an amount of wireless service, and the terminal being configured to receive a wireless service selection;
receiving a payment confirmation through the point-of-sale system after collection of payment for the selected wireless service to be associated with the unique identifier of the near field communication tag;

transmitting from the point-of-sale system an authorization message including the unique identifier of the near field communication tag and the selected wireless service to a wireless provider for recording in a database and subsequent authorization of the wireless service;

receiving a request for authorizing wireless service to a wireless provider system that includes the unique identifier, the unique identifier being associated with the type of wireless service and the amount of wireless service and the request for authorizing wireless service further includes at least one or more of the following: an electronic serial number, an international mobile station equipment identity, and to mobile equipment identifier; and monitoring and controlling the authorized wireless service utilized by a wireless device with an accounting system, wherein the wireless service selection includes one or more of the following: wireless data, text messaging, and wireless talk time.

11. The method of claim 10, wherein:
the payment confirmation is received from a payment processing register at a point-of-sale;
the unique identifier comprises at least one code corresponding to a wireless provider, a wireless service type, and an amount of wireless service; and
the monitoring and controlling the authorized wireless service utilized by the wireless device with the accounting system further comprises controlling by the wireless provider system and the accounting system at least one of the following: suspending voice calls, suspending text messages, and suspending wireless data service.

12. The method of claim 11, wherein:
the payment confirmation is generated after a payment is transmitted to the payment processing register from a digital wallet application installed on the wireless device; and
the receiving a request for authorizing wireless service to a wireless provider system comprises receiving a request on an Unstructured Supplementary Service Data (USSD) channel.

13. The method of claim 10, additionally comprising:
programing the near field communication tag associated with the unique identifier with data corresponding to the selected wireless service after the payment confirmation is received,
wherein the database does not include any unique identifiers corresponding to non-activated wireless services of near field communication tags; and
wherein the unique identifier comprises at least one code corresponding to a wireless provider, a wireless service type, and an amount of wireless service.

14. The method of claim 10, further comprising:
executing a wireless service activation application by the wireless device;
reading the near field communication tag by the wireless device executing the wireless service activation application; and
transmitting to the wireless provider, with the wireless device in response to execution of the wireless service activation application, a request for authorizing wireless service on an Unstructured Supplementary Service Data (USSD) channel that includes the unique identifier and further includes at least one or more of the following: an electronic serial number, an international mobile station equipment identity, and a mobile equipment identifier, wherein the unique identifier comprises at least one code corresponding to a wireless provider, a wireless service type, and an amount of wireless service.

15. The method of claim 10, further comprising:
storing in a database the unique identifier of the near field communication tag after the payment confirmation; and
marking the unique identifier as redeemed in the database after activation of the wireless service purchased,
wherein the unique identifier comprises at least one code corresponding to a wireless provider, a wireless service type, and an amount of wireless service.

16. The method of claim 10, further comprising:
recording in a database of the wireless provider the unique identifier of the near field communication tag corresponding and the selected wireless service associated with the payment confirmation,
wherein the unique identifier comprises at least one code corresponding to a wireless provider, a wireless service type, and an amount of wireless service.

17. A method of selling wireless services for a wireless device, the method comprising:
receiving, through a near field communication reader associated with a point-of-sale system, a unique identifier of a near field communication tag corresponding to a wireless service;
receiving a wireless service selection through a terminal implemented by the point-of-sale system, the wireless service selection comprises at least one of the following: a type of wireless service and an amount of wireless service, and the terminal being configured to receive a wireless service selection; and
transmitting from the point-of-sale system an authorization message after collection of payment for the selected wireless service to be associated with the unique identifier of the near field communication tag, the authorization message including the unique identifier of the near field communication tag and the wireless service selection to a processor of a wireless provider to associate authorization of the wireless service to the unique identifier of the near field communication tag;
recording, in a database the unique identifier of the near field communication tag after authorization has been generated for the selected wireless service corresponding to the unique identifier of the near field communication tag;
executing a wireless service activation application by the wireless device;
reading the near field communication tag by the wireless device executing the wireless service activation application;
transmitting to the wireless provider, with the wireless device in response to execution of the wireless service activation application, a request for authorizing wireless service that includes the unique identifier and further includes at least one or more of the following: an electronic serial number, an international mobile station equipment identity, and a mobile equipment identifier;
receiving the request for authorizing wireless service to a wireless provider system that includes the unique identifier, the unique identifier being associated with the type of wireless service and the amount of wireless service and the request for authorizing wireless service further includes at least one or more of the following: the electronic serial number, the international mobile station equipment identity, and the mobile equipment identifier;

marking the unique identifier as redeemed in the database after activation of the wireless service purchased; and monitoring and controlling the authorized wireless service utilized by a wireless device with an accounting system, wherein the wireless service selection includes one or more of the following: wireless data, text messaging, and wireless talk time; and wherein the monitoring and controlling the authorized wireless service utilized by the wireless device with the accounting system further comprises controlling by the wireless provider system and the accounting system at least one of the following: suspending voice calls, suspending text messages, and suspending wireless data service.

18. The method of claim 17, further comprising:

storing in a database the unique identifier of the near field communication tag after a payment confirmation; and marking the unique identifier as redeemed in the database after activation of the wireless service purchased, wherein the unique identifier comprises at least one code corresponding to a wireless provider, a wireless service type, and an amount of wireless service.

19. The method of claim 17, further comprising:

programing the near field communication tag associated with the unique identifier with data corresponding to the selected wireless service after a payment confirmation is received, wherein the near field communication tag is configured to be re-programmable; and wherein the unique identifier comprises at least one code corresponding to a wireless provider, a wireless service type, and an amount of wireless service.

20. The method of claim 17, wherein the transmitting to the wireless provider, with the wireless device in response to execution of the wireless service activation application further comprises: transmitting to the wireless provider, with the wireless device in response to execution of the wireless service activation application a request for authorizing wireless service on an Unstructured Supplementary Service Data (USSD) channel.

\* \* \* \* \*